Feb. 4, 1930.    W. H. MILLSPAUGH    1,745,685
PAPER MACHINE DRIER
Original Filed Dec. 7, 1922
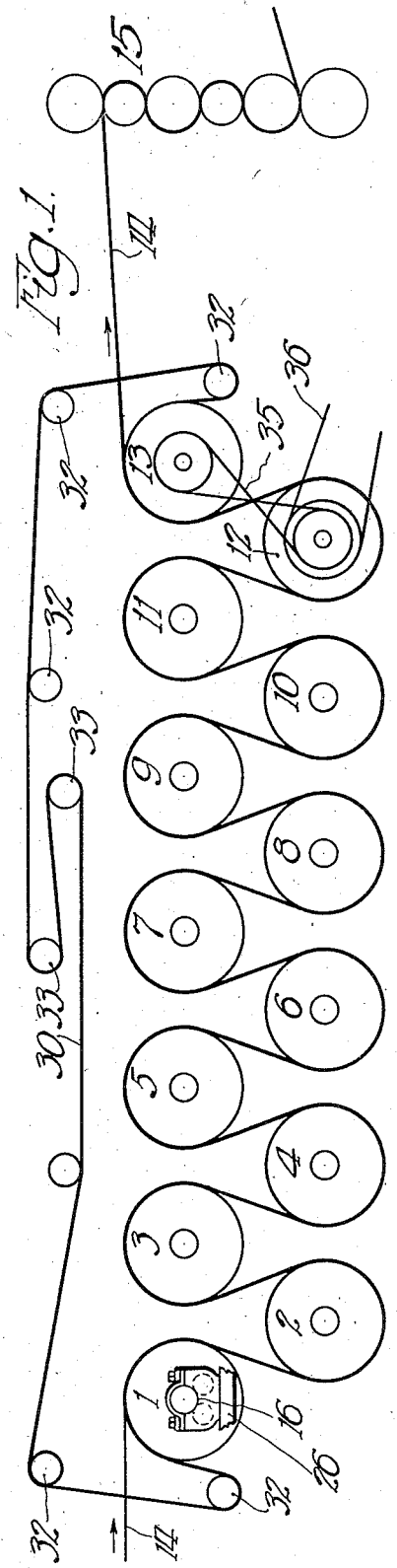
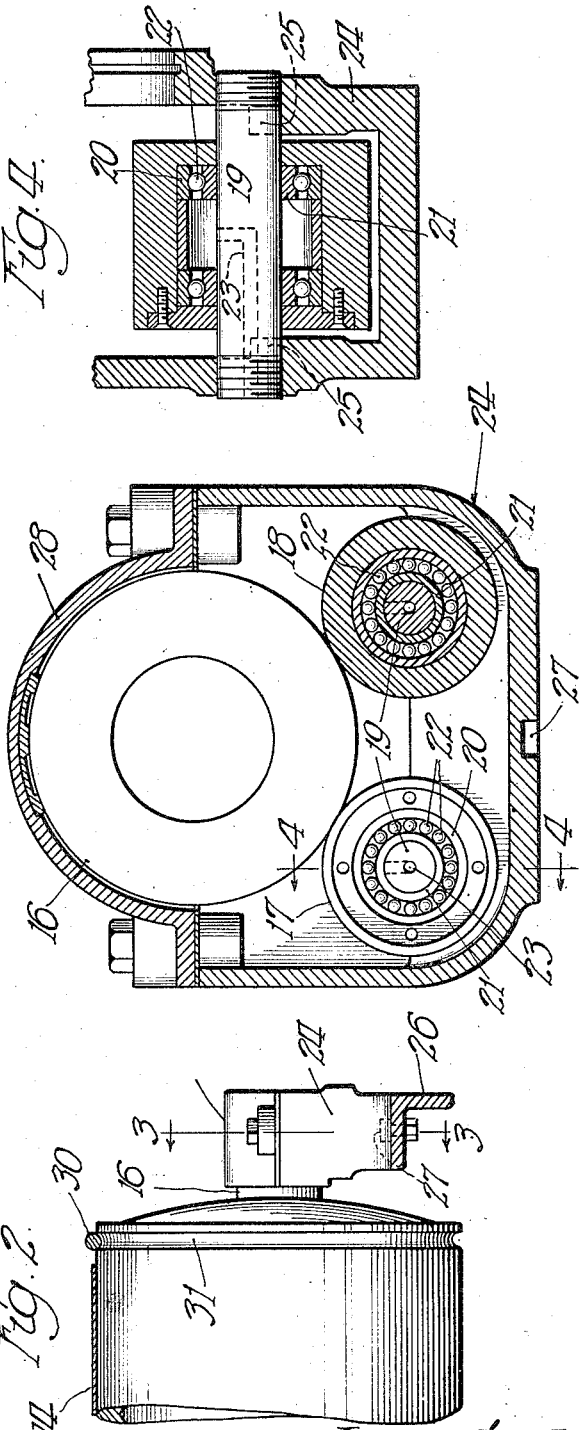
Inventor
William H. Millspaugh Patented Feb. 4, 1930

1,745,685

UNITED STATES PATENT OFFICE

WILLIAM H. MILLSPAUGH, OF SANDUSKY, OHIO, ASSIGNOR TO THE PAPER AND TEXTILE MACHINERY COMPANY, OF SANDUSKY, OHIO, A CORPORATION OF OHIO

PAPER-MACHINE DRIER

Original application filed December 7, 1922, Serial No. 605,379. Divided and this application filed March 10, 1925. Serial No. 14,407.

This invention is intended to provide an improved paper drying apparatus of the class comprising rotating heated drums or cylinders in contact with which the web to be dried is carried.

The invention will be understood by reference to an illustrative embodiment thereof shown in the annexed drawings.

In said drawings:

Fig. 1 is a diagrammatic side view of one practicable form of drying apparatus containing an embodiment of the invention;

Fig. 2 is a detail view showing in elevation one end of a drying cylinder and its journal mount;

Fig. 3 is a sectional elevation of a cylinder mounting, viewed endwise of the cylinder journal; and Fig. 4 is an enlarged cross section taken on the line 4—4 of Fig. 2.

The apparatus selected for illustration comprises a set of drying cylinders, 1 to 13 inclusive, arranged in this instance in two tiers, those of the upper tier rotating in one direction and those of the lower tier rotating in the opposite direction, so that the web of paper material 14 running through the apparatus may travel alternately in contact with the cylinders of the upper and lower tiers. For instance, in the particular arrangement illustrated, the web 14 may pass over the first cylinder 1 and then under and in contact with the lower half of the second cylinder 2 and then over and in contact with the upper half of the next cylinder 3 and so on alternately in contact with the upper and lower cylinders until the web passes from the last drying cylinder 13 to the calendering rolls 15 beyond the drier.

The drying cylinders are anti-frictionally mounted in such manner as to permit them to be easily rotated by frictionally operating means as hereinafter explained. One practicable type of cylinder mount for this purpose is shown in Figs. 3 and 4. As shown, the cylinder journal 16 bears upon and is supported by a pair of large rollers 17 and 18 which are anti-frictionally mounted on short stationary shafts 19. The anti-friction bearings for these rollers, comprising concentric race rings 20 and 21 and interposed balls or rolling elements 22, all of hardened steel, are contained and housed in the journal supporting rollers, the outer race rings being secured therein and the inner race rings being secured on the shafts 19. Lubrication may be supplied to the anti-friction bearings through passages 23 in the shafts communicating with the chambers of the rollers in which the ball bearing devices are contained. A film of oil or grease may be maintained between the contacting surfaces of the cylinder journal and journal supporting rollers by any appropriate means. The journal supporting rollers 17 and 18 are carried by a support or saddle 24 having walls enclosing the rollers and affording substantial seats 25 for the roller shafts immediately adjacent the end faces of the rollers. This support, which is mounted on the machine side rail 26 (Fig. 2) may be slightly rounded on its bottom and may be provided with a central hole 27 to pivotally engage a stud on the supporting rail, in order that the support may be self-adjusting to align the anti-frictionally mounted journal supporting rollers 17 and 18 with the journal. In this instance said support 24 is shown constructed to provide a journal box receiving the cylinder journal and having a removable cap 28.

With this type of bearing structure, the cylinder will turn very freely on the large anti-frictionally mounted journal-supporting rollers 17 and 18, which are self-aligning with the journal, and any expansion of the journal (which is subject to temperature changes by the introduction of steam or other heating medium into the cylinders) will merely raise the center of the journal without affecting the anti-friction capacity of the bearing structure. With the specific construction illustrated, the annular ball bearing devices on which the rollers 17 and 18 are mounted are substantially removed from and protected by the thick walls of the rollers from contact with the heated journals; while furthermore such short shafts may be employed so as to reduce shaft flexing under load to a minimum, and such flexing as may occur will be substantially immaterial since it will not tend to set up crystallization such as would accompany the flexing of a rotating load sustaining shaft.

Assuming that the several drying cylinders are anti-frictionally mounted either on bearings of the specific character illustrated or of other construction of the same general character or appropriate for the purpose, a comparatively slight expenditure of power will be required to set the cylinders in rotation, and in the operation of the paper machine the web of material passing through the machine may be utilized for driving purposes or to assist in the driving of the cylinders.

An endless rope 30 is shown entrained about the drying cylinders in the same manner in which the web of paper material undergoing drying action is entrained on the cylinders. This rope, located at one side of the web, engages grooves 31 (Fig. 2) provided on the end portions of the cylinders adjacent that side of the machine at which the rope is arranged. Said rope 30 typifies a driving belt and the grooved end portions of the drying cylinders typify sheaves or pulleys with which the cylinders are equipped, said sheaves being represented in this instance as constructed or provided as a part of the cylinders themselves. The endless rope 30 engages a number of guiding rollers 32 and one or more adjustable take-up rollers 33 for tightening or slackening the rope as required.

The endless rope or belt 30 may be conveniently driven by appropriate means, for instance by applying power to any selected cylinder or cylinders of the series engaged by the rope. In the particular construction shown in Fig. 1, the last two cylinders 12 and 13 are connected by a crossed belt 35 and the cylinder 12 is driven by a belt 36. Said belt may be driven from the same shaft (not shown) which drives the calendering rolls, the latter being operated synchronously with the cylinders and typifying a means for pulling the web from the cylinders.

The entire set of drying cylinders engaged by the endless rope or belt may be driven through application of power to the cylinders 12 and 13 or other selected cylinder or cylinders engaged by the rope, inasmuch as the anti-frictional mounting of the cylinders renders them immediately responsive to the travel of the rope in frictional engagement with said cylinders or the sheaves with which the respective cylinders are equipped. The tension of the rope may be regulated or adjusted so that after the machine is in operation there may be a slight permissible slippage of the rope on the cylinders to enable the cylinders to respond in speed to speed fluctuations in the web due to shrinkage or changes in temperature and moisture conditions as the drying progresses. If felts should be employed to carry the paper sheet or web in contact with the cylinders, then such felts, driven by the cylinders to which the power is applied, would serve as driving means for the remaining cylinders; and in such case the rope could be utilized as a supplemental driving agency. However, the rope drive is contemplated more especially for use in apparatus such as illustrated in which the drying cylinders are unequipped with felts or the like and are intended for drying material such for instance as paper board or other sufficiently heavy or strong material which will not require felts or other means for carrying the web around the cylinders. In drying a web of such character, the rope 30 may be depended upon to start all the drying cylinders in motion and to run the cylinders until the web is threaded through the machine. After the web is once through the machine and passing through the reel or through the calendering rolls before the reel, the web itself may be utilized to drive the drying cylinders, and the cylinders will be driven with such variations in speed of the individual cylinders as to allow for shrinkage or changes in condition of the board, this being permitted by slight slippage of the endless belt or rope in contact with the cylinder sheaves or pulleys. When driving the cylinders by the web itself, under the pull of the calenders or other apparatus beyond the drier, the power may be disconnected from the cylinders 12 and 13 or may be continued to allow utilization of the rope to assist in the drive.

It will be observed that the present invention contemplates elimination of the elaborate and expensive train of intermeshing gears which have heretofore been employed for driving the cylinders of paper machine driers, such driving gears being omitted from the illustrative apparatus; and furthermore contemplates operation of the apparatus in such manner that the drying cylinders may step up or down in speed as controlled by the shrinkage or changes in condition of the web instead of being positively gear-driven at speeds more or less unequal with the speed of the web; it being understood of course that the speed of the web is necessarily affected by shrinkage and changes in conditions as it passes through the drier.

A gearless driven paper machine drier was disclosed and broadly claimed in a prior application filed by the present inventor December 7, 1922, Ser. No. 605,379, of which the present application is a division; this application being directed to subject matter not specifically claimed per se in the aforesaid parent application.

What I claim is:

1. In a paper drying apparatus, a rotatable drying cylinder having a sheave; non-binding cylinder bearings comprising comparatively large journal-supporting rollers; and anti-friction bearings on which said rollers are mounted; whereby the cylinder may be easily rotated with light application of power by the passage of means in contact with said sheave.

2. An apparatus of the class described comprising, in combination, anti-frictionally journalled drying cylinders adapted to be driven by the entrained web undergoing drying action; and cylinder driving means constructed and arranged to permit driving of the cylinders by the web independently of said driving means.

3. An apparatus of the class described comprising, in combination, anti-frictionally journalled drying cylinders driven by an entrained web, and web-pulling means beyond the cylinders from which the cylinders are indirectly driven through such web.

4. The combination with a paper-making machine drier unit, of a plurality of drier cylinders, driving means connected to drive certain of said cylinders, and coacting friction mechanisms on all of said cylinders to permit the cylinders to receive a drive from said driving means.

5. A paper-machine drier unit comprising a series of drying cylinders with grooved sheaves and a driving rope frictionally engaging said sheaves, driving means connected to drive certain of said cylinders, the other said cylinders being antifrictionally mounted and indirectly driven from said means through said rope.

6. A paper-machine drier unit comprising a series of antifrictionally mounted drying cylinders adapted to be driven by the entrained web undergoing drying action, said cylinders having grooved sheaves and a rope frictionally engaging the same, and driving means connected to drive certain of said cylinders, the construction and arrangement permitting driving of the cylinders by the web or by the said driving means and rope.

In testimony whereof, I have signed my name to this specification.

WILLIAM H. MILLSPAUGH.